(12) United States Patent
Manabe et al.

(10) Patent No.: US 11,105,672 B2
(45) Date of Patent: Aug. 31, 2021

(54) LIQUID LEVEL DETECTION UNIT (71) Applicant: AISAN KOGYO KABUSHIKI KAISHA, Obu (JP)

(72) Inventors: Yuichi Manabe, Inazawa (JP); Nobuo Suzuki, Obu (JP)

(73) Assignee: Aisan Kogyo Kabushiki Kaisha, Obu (JP)

( * ) Notice: Subject to any disclaimer, the term of this patent is extended or adjusted under 35 U.S.C. 154(b) by 202 days.

(21) Appl. No.: 16/466,777

(22) PCT Filed: Nov. 9, 2017

(86) PCT No.: PCT/JP2017/040385
§ 371 (c)(1),
(2) Date: Jun. 5, 2019

(87) PCT Pub. No.: WO2018/105300
PCT Pub. Date: Jun. 14, 2018

(65) Prior Publication Data
US 2020/0080885 A1 Mar. 12, 2020

(30) Foreign Application Priority Data
Dec. 6, 2016 (JP) .............................. JP2016-237050

(51) Int. Cl.
*G01F 23/38* (2006.01)
(52) U.S. Cl.
CPC .................................. *G01F 23/38* (2013.01)
(58) Field of Classification Search
CPC ....................................................... G01F 23/38
See application file for complete search history.

(56) References Cited

U.S. PATENT DOCUMENTS

2008/0072668 A1* 3/2008 Miyagawa .............. G01F 23/38
73/319
2012/0285240 A1* 11/2012 Yasuda ................... G01F 23/38
73/313
(Continued)

FOREIGN PATENT DOCUMENTS

JP    2007-147582 A    6/2007
JP    2009-243928 A    10/2009
(Continued)

OTHER PUBLICATIONS

International Preliminary Report on Patentability (IPER) (English translation) for PCT/JP2017/040385 dated Jan. 28, 2019 (7 pages).
(Continued)

*Primary Examiner* — John Fitzgerald
(74) *Attorney, Agent, or Firm* — Shumaker, Loop & Kendrick, LLP (57) ABSTRACT

A liquid surface detecting unit includes a reservoir cup; a body attached to a side wall of the reservoir cup; an arm rotatably supported by the body; a sensor unit stored in the body and configured to detect rotating motion of the arm; a terminal unit extending from the sensor unit; and a wire harness connected to the terminal unit and extending to an outside of the body. The body may include a groove surrounding and guiding the wire harness together with the side wall of the reservoir cup, the wire harness extending from the terminal unit to the outside of the body.

5 Claims, 5 Drawing Sheets (56) References Cited

U.S. PATENT DOCUMENTS

| | | | |
|---|---|---|---|
| 2015/0308880 A1* | 10/2015 | Go | G01F 23/38 73/317 |
| 2015/0308881 A1* | 10/2015 | Go | G01F 23/38 73/317 |
| 2016/0047686 A1* | 2/2016 | Terada | G01F 23/38 73/317 |
| 2016/0109279 A1 | 4/2016 | O'Neil | |
| 2016/0209262 A1* | 7/2016 | Terada | G01F 23/38 |
| 2016/0223384 A1* | 8/2016 | Manabe | G01F 23/38 |
| 2018/0348037 A1* | 12/2018 | Kato | G01F 23/38 |
| 2018/0348042 A1* | 12/2018 | Kato | G01F 23/38 |
| 2018/0348043 A1* | 12/2018 | Kato | G01D 5/145 |
| 2018/0348044 A1* | 12/2018 | Hirose | G01F 23/36 |
| 2018/0348046 A1* | 12/2018 | Hirose | G01F 23/603 |
| 2019/0137319 A1* | 5/2019 | Manabe | G01F 23/38 |
| 2019/0170561 A1* | 6/2019 | Manabe | G01F 23/38 |

FOREIGN PATENT DOCUMENTS

| | | | | |
|---|---|---|---|---|
| JP | 2010-048780 A | | 3/2010 | |
| JP | 2010-256239 A | | 11/2010 | |
| JP | 2012-017693 A | | 1/2012 | |
| JP | 2012-181106 A | | 9/2012 | |
| JP | 2015117968 A | * | 6/2015 | C08G 75/14 |
| JP | 2016-057099 A | | 4/2016 | |

OTHER PUBLICATIONS

English Translation of International Search Report (ISR) for PCT/JP2017/040385 dated Jan. 23, 2018 (1 page).

* cited by examiner

LIQUID LEVEL DETECTION UNIT

TECHNICAL FIELD

The art disclosed herein relates to a liquid surface detecting unit configured to detect a liquid surface of liquid (such as a device configured to detect a liquid surface of fuel stored in a fuel tank of a vehicle).

BACKGROUND ART

Japanese Patent Application Publication No. 2012-181106 describes a liquid surface detecting device provided with a body, an arm rotatably supported by the body, and a detection unit for detecting rotation of the arm. The detection unit is connected to an external apparatus by three terminals and wire harnesses connected to the terminals.

The body is attached to a side wall of a reservoir cup. The body is provided with grooves within which the wire harnesses, which extend from a terminal unit, extend. The grooves have their ends on a reservoir cup side closed, extend in a direction separating away from the reservoir cup, and are open to an opposite side from the reservoir cup.

SUMMARY

Technical Problem

In a state where a liquid surface detecting device is disposed in a container, a wire harness may wobble with respect to a body due to deformation of the container. As a result, if the wire harness is displaced within a groove in a direction separating away from a reservoir cup, force is applied to a connection between the wire harness and a terminal unit, and there is a possibility that the wire harness is detached from the terminal unit.

The disclosure herein provides a technique that suppresses a wire harness from being displaced in a groove in a direction separating away from a reservoir cup.

Solution to Technical Problem

A liquid surface detecting unit may comprise: a reservoir cup; a body attached to a side wall of the reservoir cup; an arm rotatably supported by the body; a sensor unit housed in the body and configured to detect rotating motion of the arm; a terminal unit extending from the sensor unit; and a wire harness connected to the terminal unit and extending to an outside of the body. The body may comprise a groove surrounding and guiding the wire harness together with the side wall of the reservoir cup, and the wire harness may extend from the terminal unit to the outside of the body.

According to the above configuration, the wire harness is surrounded by the groove of the body and the side wall of the reservoir cup. According to this configuration, displacement of the wire harness may be restricted. Due to this, the wire harness may be suppressed from being displaced in the groove in a direction separating away from the reservoir cup. Further, since the wire harness is surrounded by the groove and the reservoir cup, a cover or the like does not need to be additionally provided at an open portion of the groove.

The terminal unit may comprise three terminals arranged at intervals from each other. The body may comprise: partitioning walls, each arranged in a space between a pair of the adjacent terminals and extending from the side wall of the reservoir cup toward an opposite side from the reservoir cup beyond the terminals; and a connecting wall extending in a direction intersecting the partitioning walls at a position spaced apart from an end of the terminal unit on an opposite side from the sensor unit, connecting the partitioning walls adjacent to each other, extending from the side wall of the reservoir cup toward the opposite side from the reservoir cup beyond the terminal unit, and including the groove. Since the partitioning walls arranged between the adjacent terminals extend from the side wall of the reservoir cup toward the opposite side from the reservoir cup beyond the terminals, electric erosion of the terminals may be suppressed while the terminal unit is immersed in liquid in a container. Further, the partitioning walls may be strengthened by the connecting wall, by which the partitioning walls may be suppressed from breaking.

The terminal unit may be exposed from the body. The electric erosion can be suppressed by the partitioning walls even if the terminal unit is exposed outside. Due to this, a cover for protecting the terminal unit from the electric erosion does not need to be provided. As a result, a connection state of the terminal unit and the wire harness may easily be checked upon maintenance, for example.

The reservoir cup may comprise a projection configured to be inserted to the groove and to surround the wire harness together with the groove. According to this configuration, the wire harness may be constrained within the groove by the projection. As a result, the wire harness may be suppressed from being displaced in the groove in the direction separating away from the reservoir cup.

Each of the body and the reservoir cup may comprise an engaging mechanism. The engaging mechanisms may be configured to engage with each other by sliding the body with respect to the reservoir cup in an extending direction of the wire harness. The projection may have a height from the side wall of the reservoir cup and the height may gradually increase along a direction in which the body is slid upon engaging the engaging mechanisms. According to this configuration, the projection may be smoothly inserted into the groove when the body is attached to the side wall of the reservoir cup by being slid in a state where the wire harness is arranged in the groove.

DETAILED DESCRIPTION

Figure 1:
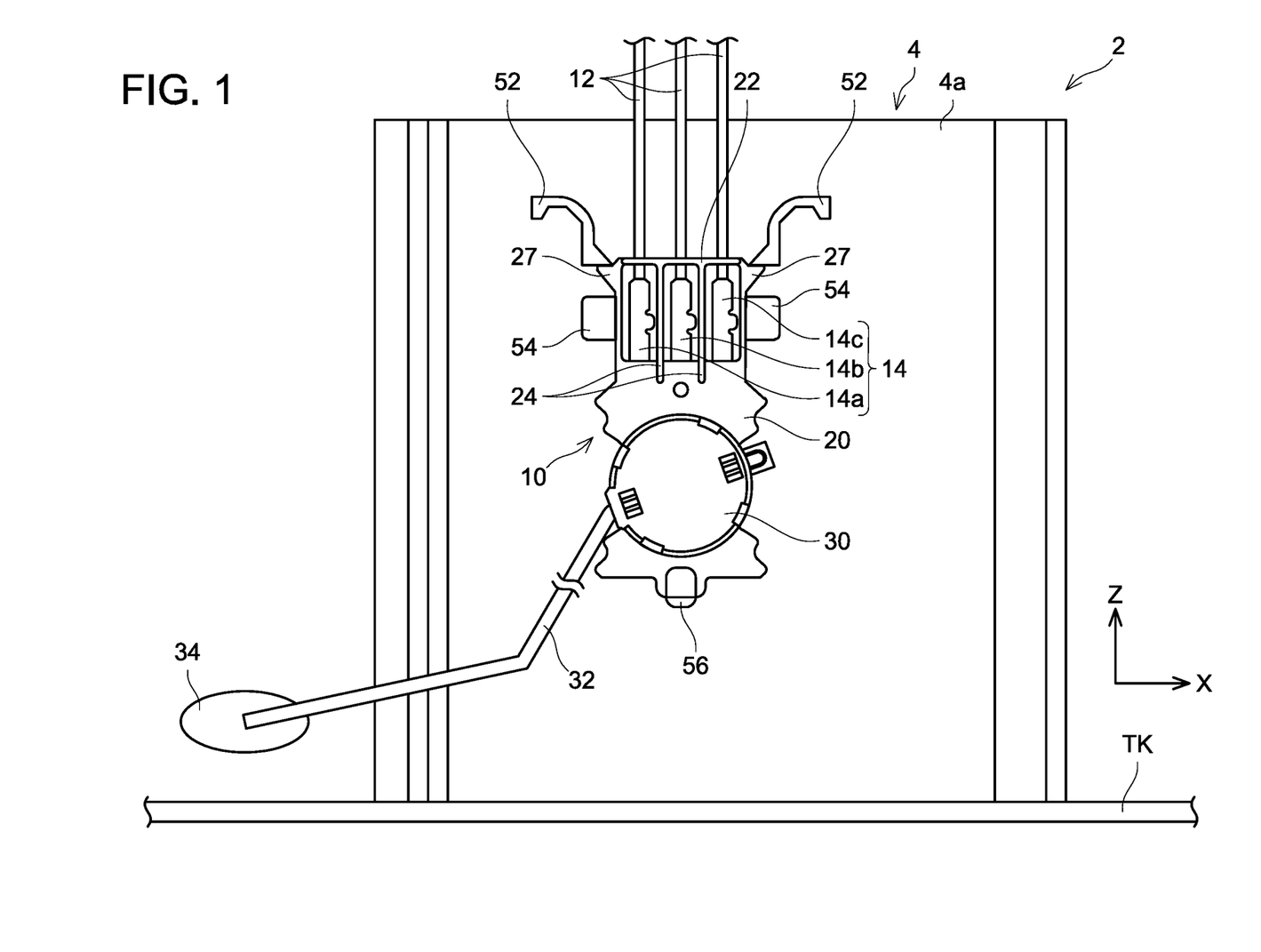
FIG. 1 shows a front view of a liquid surface detecting unit according to an embodiment.

A liquid surface detecting unit 2 shown in FIG. 1 is configured to detect a liquid surface of fuel in a fuel tank TK mounted on a vehicle such as an automobile. The liquid surface detecting unit 2 is arranged within the fuel tank TK.

The liquid surface detecting unit 2 comprises a reservoir cup 4 and a liquid surface detecting device 10. The reservoir cup 4 houses a fuel pump which is not shown. The fuel outside the reservoir cup 4 is supplied to the reservoir cup 4 by a jet pump (not shown) using the fuel discharged from the fuel pump.

The liquid surface detecting device 10 is attached to an outer surface of a side wall 4a of the reservoir cup 4. The liquid surface detecting device 10 comprises a body 20, a float 34, an arm 32, a rotary member 30, a sensor unit 40 (see FIG. 2), a terminal unit 14, and wire harnesses 12. The float 34 is floating on the fuel in the fuel tank TK and is configured to move in an up-and-down direction following the liquid surface of the fuel. The float 34 is rotatably attached to a distal end of the arm 32. A base end of the arm 32 is supported by the rotary member 30. The rotary member 30 is rotatably supported by the body 20. When the float 34 moves up or down following the liquid surface of the fuel in the fuel tank TK, the arm 32 swings and rotates with respect to the body 20. That is, the arm 32 converts up-and-down motion of the float 34 to rotating motion.

The rotary member 30 is configured to rotate with respect to the body 20 following the rotation of the arm 32. A permanent magnet is fixed to the rotary member 30. The permanent magnet is arranged so that a direction of magnetic flux or an intensity of magnetic flux changes according to the rotation of the rotary member 30.

Figure 2:
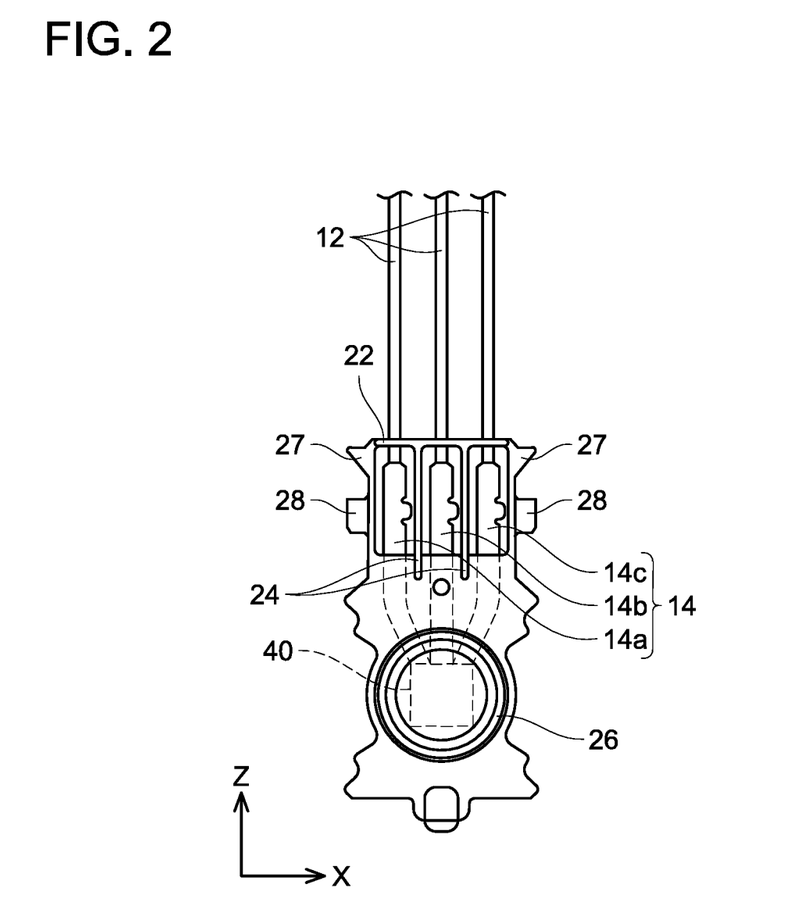
FIG. 2 shows a front view of the liquid surface detecting unit according to the embodiment in a state where an arm and a rotary member are detached.

As shown in FIG. 2, the body 20 comprises a guide rail 26 that guides the rotary member 30. The guide rail 26 has an annular ring shape. The rotary member 30 is configured to rotate along the guide rail 26. The sensor unit 40 is housed in the body 20. The body 20 covers the sensor unit 40. The sensor unit 40 is arranged to face the permanent magnet of the rotary member 30.

The sensor unit 40 is configured to detect the rotating motion of the arm 32 by detecting change in the direction of the magnetic flux or the intensity of the magnetic flux of the permanent magnet of the rotary member 30 and to output an analog signal corresponding to a fuel amount stored in the fuel tank TK to a fuel meter (not shown) based on the detection result. The sensor unit 40 includes a magnetic sensor configured to detect a rotation angle of the permanent magnet, that is, a rotation angle of the arm 32, which is a magnetic detecting element such as a known sensor with an MRE (abbreviation of Magnet Resistive Element) or a Hall IC.

The terminal unit 14 extends upward from the sensor unit 40. The terminal unit 14 comprises an input terminal 14a, an output terminal 14c, and a ground terminal 14b. The three terminals 14a, 14b, 14c each have a flat plate-like shape.

Each of the wire harnesses 12 is connected to corresponding one of the terminals 14a, 14b, 14c. Specifically, the wire harnesses 12 are fixed to the respective terminals 14a, 14b, 14c by being riveted and welded to the respective terminals 14a, 14b, 14c. The wire harnesses 12 extend in a Z direction from the terminal unit 14 toward an outside of the body 20. Each of the wire harnesses 12 includes a conductive wire and a resin cover covering the conductive wire.

Each of the terminals 14a, 14b, 14c is exposed to the outside from the body 20 at a portion thereof connected with its corresponding wire harness 12. Due to this, connection states of the terminals 14a, 14b, 14c and the wire harnesses 12 can easily be checked. Other portions of the terminals 14a, 14b, 14c are covered by the body 20.

Figure 3:
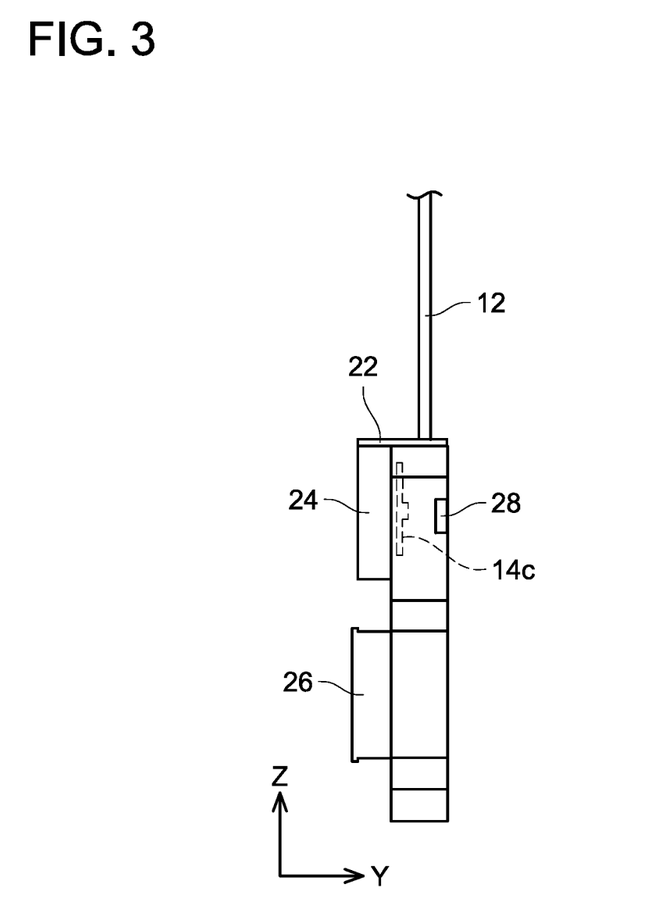
FIG. 3 shows a side view of the liquid surface detecting unit according to the embodiment in a state where the arm and the rotary member are detached.

The body 20 comprises partitioning walls 24 arranged respectively between the terminals 14a and 14b that are adjacent to each other and between the terminals 14b and 14c that are adjacent to each other. One of the partitioning walls 24 is located at a center between the terminals 14a and 14b. The terminals 14a and 14b that are respectively located on both sides of the partitioning wall 24 in an X direction, and is separated from both the terminals 14a and 14b. The other of the partitioning walls 24 is located at a center between the terminals 14b and 14c that are located respectively on one of both sides of the partitioning wall 24 in the X direction, and is separated from both the terminals 14b and 14c. The partitioning walls 24 each have a flat plate-like shape. As shown in FIG. 3, each partitioning wall 24 extends in a Y direction from an end surface of the body 20 on a side wall 4a side to a position separated away from the reservoir cup 4 beyond the terminal unit 14. In FIG. 3, the exposed portion of the terminal 14c is indicated by a broken line.

The partitioning walls 24 extend in the Z direction along the terminals 14a, 14b, 14c. One ends of the partitioning walls 24 are arranged to be separated father apart from the sensor unit 40 than ends of the terminals 14a, 14b, 14c on an opposite side from the sensor unit 40, and other ends of the partitioning walls 24 extend closer to the sensor unit 40 than the exposed portions of the terminals 14a, 14b, 14c.

As shown in FIG. 2, the body 20 further comprises a connecting wall 22 connecting the one ends of the two partitioning walls 24 in the Z direction. The connecting wall 22 has a flat plate-like shape. The connecting wall 22 is arranged vertically with respect to the partitioning walls 24. The connecting wall 22 is arranged at an end of the body 20 on a side where the wire harnesses 12 are arranged. As shown in FIG. 3, the connecting wall 22 extends in the Y direction from the end surface of the body 20 on the side wall 4a side to a position separated apart from the reservoir cup 4 beyond the terminal unit 14. An distal edge of the connecting wall 22 in the Y direction is located on a same plane on which end edges of the partitioning walls 24 are located.

Figure 6:
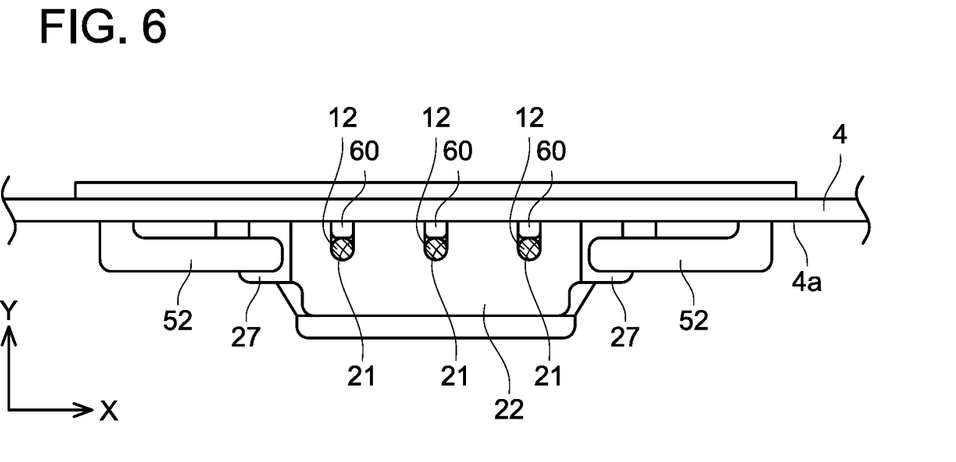
FIG. 6 shows a plan view of the liquid surface detecting unit according to the embodiment.

As shown in FIG. 2, the connecting wall 22 extends in the X direction from above the terminal 14a to above the terminal 14c. As shown in FIG. 6, the connecting wall 22 includes grooves 21, through which the three wire harnesses 12 penetrate. The grooves 21 each have a U-shape. The grooves 21 are open at an end of the body 20 on the side wall 4a side. A length of the grooves 21 in the X direction is somewhat smaller than a diameter of the wire harnesses 12. The grooves 21 extend in the Y direction from the end of the body 20 on the side wall 4a side to above the terminals 14a, 14b, 14c. According to this configuration, the grooves 21 can guide the wire harnesses 12, which extend straight from the terminals 14a, 14b, 14c, by bottoms and side surfaces of the grooves 21.

The body 20 has its end on a reservoir cup 4 side contact with the side wall 4a of the reservoir cup 4. That is, the body 20 is directly attached to the side wall 4a of the reservoir cup 4 but is not attached to the side wall 4a via an adapter or the like provided separately from the body 20 and the reservoir cup 4. As shown in FIG. 2, the body 20 and the reservoir cup 4 are fixed to each other by engaging mechanisms (27, 28, 52, 54). The engaging mechanisms (27, 28, 52, 54, 56) include engaging portions 27, 28, 52, 54. Specifically, the engaging portions 28 of the body 20 project respectively from both ends of the body 20 in the X direction. The engaging portions 27 are respectively located at the both ends of the body 20 in the X direction at one end of the body 20 in the Z direction.

The engaging portions 54 of the reservoir cup 4 project toward a body 20 side from the side wall 4a. The engaging portions 54 have spaces for receiving the engaging portions 28 between themselves and the side wall 4a. The engaging portions 54 include support plates supporting the engaging portions 28, which are inserted in the spaces between themselves and the side wall 4a, from a lower side in the Z direction. The engaging portions 54 of the reservoir cup 4 project toward the body 20 side from the side wall 4a.

When the body 20 is to be attached to the reservoir cup 4, the body 20 is slid in the Z direction along the side wall 4a to insert the engaging portions 28 of the body 20 into the spaces between the engaging portions 54 and the side wall 4a from above the engaging portions 54 of the reservoir cup 4. By doing so, the engaging portions 28 and the engaging portions 52 engage with each other. Further, the engaging portions 28 and the engaging portions 54 engage with each other by the engaging portions 54 of the reservoir cup 4 abutting the engaging portions 27 of the body 20 from above. The body 20 is thereby fixed to the reservoir cup 4. In this state, the body 20 is supported from below by a support wall 56 projecting from the side wall 4a.

Figure 4:
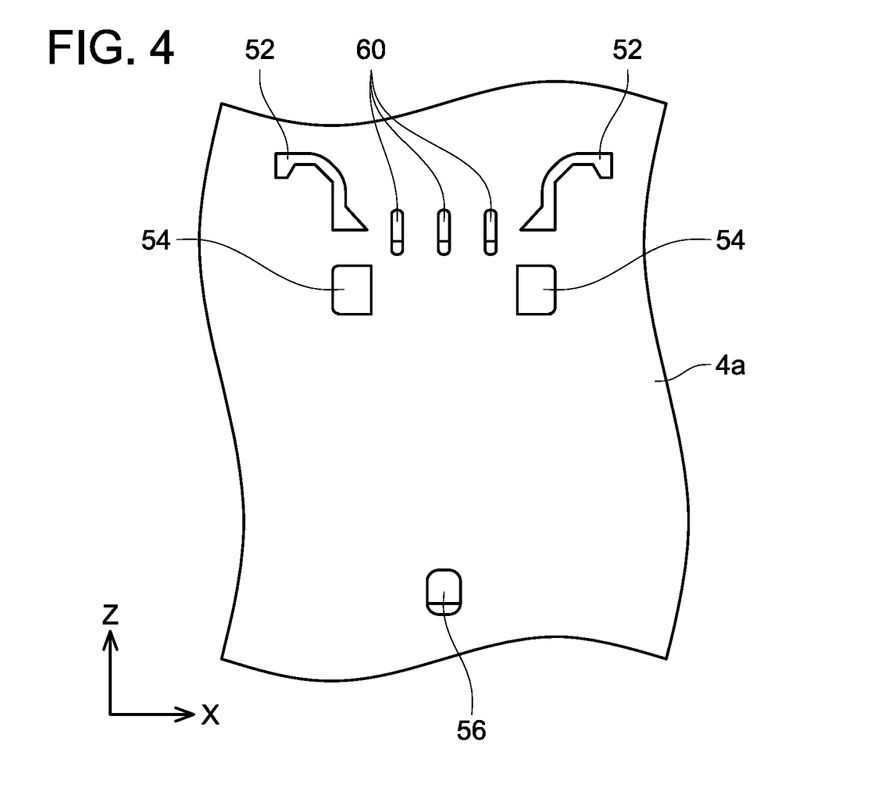
FIG. 4 shows a front view of a side wall of a reservoir cup, which shows engaging portions and projections.
Figure 5:
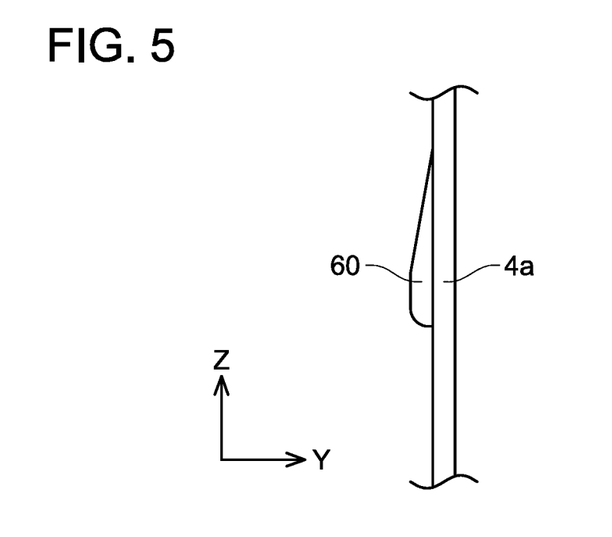
FIG. 5 shows a side view of the projection.

As shown in FIGS. 4 and 6, projections 60 are arranged on the side wall 4a at positions corresponding to the grooves 21. The projections 60 project from the side wall 4a toward the body 20 side. The projections 60 extend in an extending direction of the wire harnesses 12, that is, in the Z direction. As shown in FIG. 5, the projections 60 have a length in the Y direction (that is, a height from the side wall 4a) which gradually increases in a direction along which the body 20 in the Z direction is slid with respect to the reservoir cup 4, that is, along the Z direction. When the body 20 is to be attached to the reservoir cup 4, the projections 60 are inserted into the grooves 21. As the body 20 is slid more with respect to the side wall 4a, the length of projections 60 inserted into the grooves 21 becomes larger. Due to this, spaces for the wire harnesses 12 in the grooves 21 gradually decrease as the body 20 is slid.

As shown in FIG. 6, in a state where the body 20 is fixed to the reservoir cup 4, each wire harness 12 is surrounded by the corresponding projection 60 and groove 21. A space between the projection 60 and the groove 21 in the Y direction is somewhat smaller than the diameter of the wire harness 12. As a result, the wire harness 12 can suitably be retained by the projection 60 and the groove 21. Further, as compared to a case in which the projections 60 has a constant length in the Y direction, the wire harnesses 12 and the projections 60 can be suppressed from interfering with each other while the body 20 is being slid, thus the projections 60 can be smoothly inserted into the grooves 21.

In the liquid surface detecting unit 2, the wire harnesses 12 are surrounded by the grooves 21 of the body 20 and the side wall 4a of the reservoir cup 4. According to this configuration, displacement of the wire harnesses 12 can be suppressed. Due to this, the wire harnesses 12 can be suppressed from wobbling with respect to the body 20 and the wire harnesses 12 can be suppressed from displacing in a direction separating away from the reservoir cup 4. Further, since the wire harnesses 12 are surrounded by the grooves 21 and the reservoir cup 4, a cover or the like does not need to be additionally provided at the open portions of the grooves 21.

Further, since the partitioning walls 24 arranged between the adjacent terminals 14a, 14b, 14c extend from the side wall 4a of the reservoir cup 4 toward the opposite side from the reservoir cup 4 beyond the terminals 14a, 14b, 14c, electric erosion of the terminals 14a, 14b, 14c can be suppressed while the terminal unit 14 is immersed in the fuel. Due to this, a cover for protecting the terminal unit 14 from the electric erosion does not need to be additionally provided.

Further, the partitioning walls 24 can be strengthened by the connecting wall 22, by which the partitioning walls 24 can be suppressed from breaking. Further, although the connecting wall 22 is relatively long in the direction separating away from the side wall 4a, a distance to the side wall 4a from the positions where the terminal unit 14 and the wire harnesses 12 are connected does not change. Since the grooves 21 are open to the side wall 4a side and bottom ends of the grooves 21 are arranged at the positions where the terminal unit 14 and the wire harnesses 12 are connected, the length of the grooves 21 in the Y direction does not need to be changed although the connecting wall 22 is relatively long in the direction separating away from the side wall 4a. Due to this, as compared to a case in which the grooves 21 are open to an opposite side from the side wall 4a in the connecting wall 22, the grooves 21 can be made shorter. Due to this, a movable range of the wire harnesses 12 within the grooves 21 can be made small.

Further, the wire harnesses 12 can be constrained within the grooves 21 by the projections 60. As a result, the wire harnesses 12 can be suppressed from displacing in the direction separating away from the reservoir cup 4 in the grooves 21.

While specific examples of the present disclosure have been described above in detail, these examples are merely illustrative and place no limitation on the scope of the patent claims. The technology described in the patent claims also encompasses various changes and modifications to the specific examples described above.

(1) Other than the liquid surface detecting device 10 configured to detect the amount of fuel in the fuel tank TK, the "liquid surface detecting unit" in the disclosure herein may be provided with, for example, a liquid surface detecting device configured to detect a liquid surface in a water tank or in a water reservoir (that is, a water level or volume of stored water).

(2) The liquid surface detecting device 10 may be attached to an inner surface of the side wall 4a of the reservoir cup 4.

(3) The reservoir cup 4 may not be provided with the projections 60.

(4) The projections 60 may have a constant length in the Y direction along the Z direction.

(5) A number of the terminals 14a, 14b, 14c in the terminal unit 14 is not limited to three. The number of terminals may suitably be determined depending on a type of a sensor in a sensor unit.

(6) Each groove 21 and the side wall 4a may be arranged with an interval therebetween. In this case, the interval between the end of the groove 21 on the side wall 4a side and the side wall 4a may be smaller than the diameter of the wire harness 12. Due to this, the wire harness 12 can be suppressed from detaching from the groove 21. This variant is also encompassed in the configuration "the body comprises a groove surrounding and guiding the wire harness together with the side wall of the reservoir cup, the wire harness extending from the terminal unit to the outside of the body".

(7) The length of the grooves 21 in the X direction may be equal to the diameter of the wire harnesses 12, or may be larger than the diameter of the wire harnesses 12. Further, a distance in the Y direction between the grooves 21 and the side wall 4a or the projections 60 may be equal to the diameter of the wire harnesses 12, or may be larger than the diameter of the wire harnesses 12.

The technical elements explained in the present description or drawings provide technical utility either independently or through various combinations. The present disclosure is not limited to the combinations described at the time the claims are filed. Further, the purpose of the examples illustrated by the present description or drawings is to satisfy multiple objectives simultaneously, and satisfying any one of those objectives gives technical utility to the present disclosure.

The invention claimed is:

1. A liquid surface detecting unit comprising:
a reservoir cup;
a body attached to a side wall of the reservoir cup;
an arm rotatably supported by the body;
a sensor unit housed in the body and configured to detect rotating motion of the arm;
a terminal unit extending from the sensor unit; and
a wire harness connected to the terminal unit and extending to an outside of the body,
wherein
the body comprises a groove surrounding and guiding the wire harness together with the side wall of the reservoir cup, the wire harness extending from the terminal unit to the outside of the body, wherein
the terminal unit comprises three terminals arranged at intervals from each other, and
the body comprises:
partitioning walls, each arranged in a space between a pair of adjacent terminals among the three terminals and extending from the side wall of the reservoir cup toward an opposite side from the reservoir cup beyond the terminals;
a connecting wall extending in a direction intersecting the partitioning walls at a position spaced apart from an end of the terminal unit on an opposite side from the sensor unit, connecting the partitioning walls adjacent to each other, extending from the side wall of the reservoir cup toward the opposite side from the reservoir cup beyond the terminal unit, and including groove, and
the reservoir cup comprises a projection configured to be inserted to the groove and to surround the wire harness together with the groove.

2. The liquid surface detecting unit according to claim 1, wherein
the terminal unit is exposed from the body.

3. The liquid surface detecting unit according to claim 1, wherein
each of the body and the reservoir cup comprises an engaging mechanism, the engaging mechanisms configured to engage with each other by sliding the body with respect to the reservoir cup in an extending direction of the wire harness, and
the projection has a height from the side wall of the reservoir cup, the height gradually increasing along a direction in which the body is slid upon engaging the engaging mechanisms.

4. A liquid surface detecting unit comprising:
a reservoir cup;
a body attached to a side wall of the reservoir cup;
an arm rotatably supported by the body;
a sensor unit housed in the body and configured to detect rotating motion of the arm;
a terminal unit extending from the sensor unit; and
a wire harness connected to the terminal unit and extending to an outside of the body,
wherein
the body comprises a groove surrounding and guiding the wire harness together with the side wall of the reservoir cup, the wire harness extending from the terminal unit to the outside of the body; and
the reservoir cup comprises a projection configured to be inserted to the groove and to surround the wire harness together with the groove.

5. The liquid surface detecting unit according to claim 4, wherein
each of the body and the reservoir cup comprises an engaging mechanism, the engaging mechanisms configured to engage with each other by sliding the body with respect to the reservoir cup in an extending direction of the wire harness, and
the projection has a height from the side wall of the reservoir cup, the height gradually increasing along a direction in which the body is slid upon engaging the engaging mechanisms.

* * * * *